United States Patent [19]

Swindell

[11] 3,738,121
[45] June 12, 1973

[54] TEMPERATURE MODIFYING APPARATUS USING EXPENDABLE REFRIGERANT

[76] Inventor: Park T. Swindell, Villa 92, Imperial Southgate, Lakeland, Florida 33803

[22] Filed: Nov. 12, 1971

[21] Appl. No.: 198,293

[52] U.S. Cl. .................................. 62/378, 62/57
[51] Int. Cl. ........................................ F25d 25/00
[58] Field of Search .............. 34/10; 62/57, 64, 62/63, 74, 378; 264/14, 28

[56] References Cited
UNITED STATES PATENTS

| | | | |
|---|---|---|---|
| 2,751,756 | 6/1956 | Hughes et al. | 62/57 |
| 3,313,032 | 4/1967 | Malecki | 34/10 X |
| 3,349,500 | 10/1967 | Wall | 34/10 |
| 3,436,837 | 4/1969 | Abelow et al. | 62/57 |
| 3,542,347 | 11/1970 | Goldney et al. | 34/10 X |
| 3,592,395 | 7/1971 | Lockwood et al. | 34/10 X |

Primary Examiner—Meyer Perlin
Assistant Examiner—Ronald C. Capossela
Attorney—A. Yates Dowell, Jr.

[57] ABSTRACT

Apparatus which uses an expendable gaseous refrigerant in counterflow heat exchange relationship with a product freely falling by gravity generally axially of a refrigerating chamber for individually quick freezing the product.

4 Claims, 3 Drawing Figures

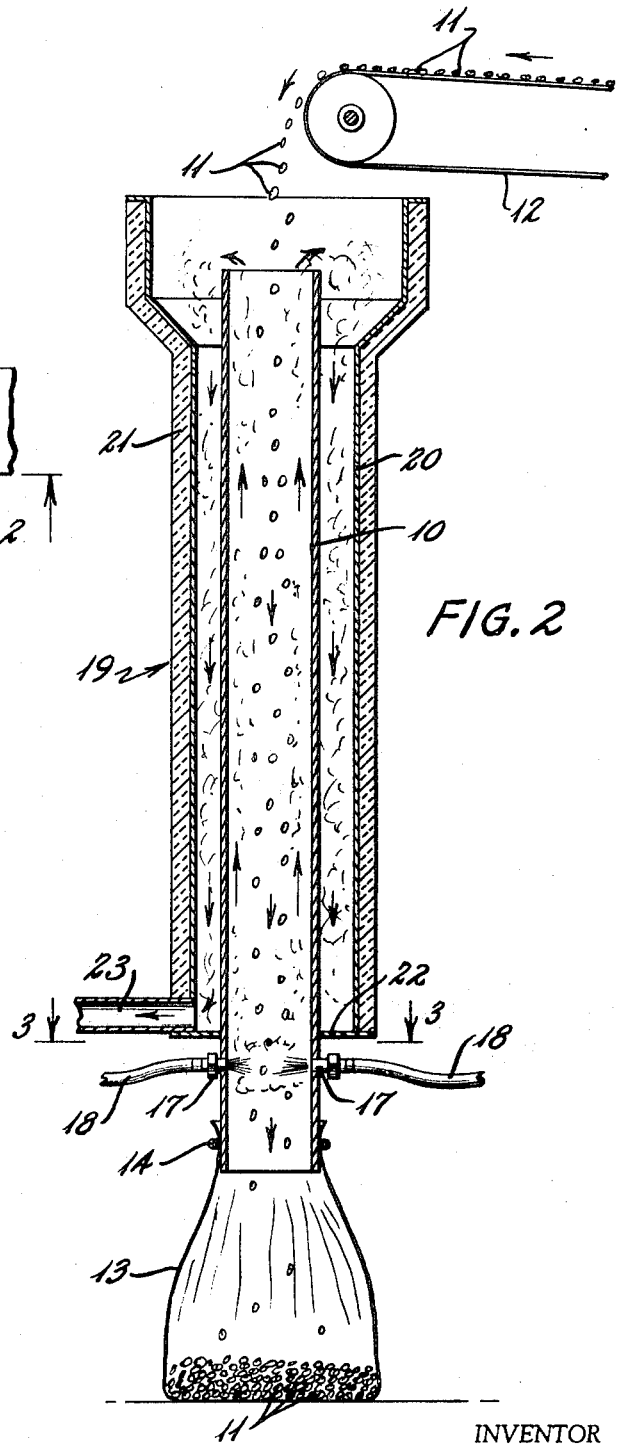
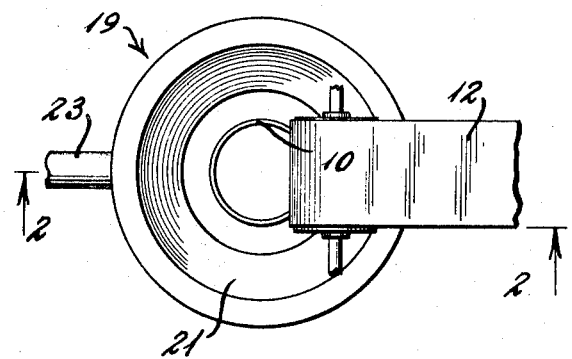
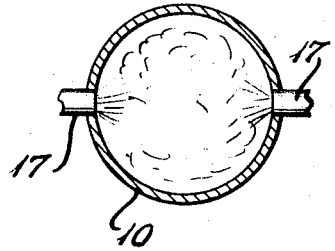
FIG.1
FIG.2
FIG.3
INVENTOR
PARK T. SWINDELL

TEMPERATURE MODIFYING APPARATUS USING EXPENDABLE REFRIGERANT

BACKGROUND OF THE INVENTION

1. Field of the Invention

This invention relates generally to the modifying of temperature of various products and relates particularly to the modifying of product temperature by using an expendable gaseous refrigerant in counterflow heat exchange relationship with the product whose temperature is to be modified.

2. Description of the Prior Art

Heretofore many efforts have been made to modify the temperature of various products including the quick freezing of relatively small particulate products by moving such products along the conveyor located within a thermally insulated chamber and subjecting the products to a refrigerant during such movement. Some examples of this type of temperature modifying apparatus are disclosed in the U.S. Pats. to Aberdorfer, No. 3,214,928 and Rubin, No. 3,446,030.

Another type of conventional temperature modifying apparatus has utilized the fluidized bed principle in which the product to be treated is placed in a chamber having a screen and a gaseous refrigerant such as refrigerated air is forced upwardly through the screen to maintain the individual products at least partially in suspension until discharged. Examples of this type of apparatus are disclosed in the U.S. Pats. to Persson, No. 3,169,381 and Rex, No. 2,506,317.

Some efforts have been made to modify the temperature of liquid products for either drying or cooling the products by passing such products in counterflow heat exchange relationship with a treating medium such as heated or chilled air. An example of this type of apparatus is in the U.S. Pat. to Bowen, No. 2,335,732.

Generally, these prior art devices have been expensive to purchase and maintain, have required extensive periods of time to warm up and cool down, the product has agglomerated or has frozen to the equipment, and for other reasons have not been satisfactory for continuous operation.

SUMMARY OF THE INVENTION

The present invention is a relatively simple apparatus for quickly modifying the temperature of particulate products by introducing the products into a vertically disposed chamber where the products fall by gravity in counterflow heat exchange relationship with an expendable refrigerant having a controlled flow so that the products can be either chilled or individually quick frozen. The apparatus includes an elongated vertically disposed chamber having a receptacle closing one end so that the refrigerant introduced into the chamber adjacent to the lower portion thereof is forced upwardly in counterflow heat exchange relationship with the product and will spill over the upper edge to exclude air from the chamber. The refrigerant discharged from the chamber flows downwardly around the periphery thereof to cool the outside of the chamber and reduces the transfer of heat from the exterior to the interior of the chamber.

It is an object of the invention to provide a temperature modifying apparatus including a generally vertically disposed chamber through which products to be treated are permitted to free fall by gravity in direct counterflow heat exchange relationship with an expendable refrigerant.

BRIEF DESCRIPTION OF THE DRAWINGS

FIG. 1 is a top plan view illustrating one application of the invention.

FIG. 2 is a section on the line 2—2 of FIG. 1.

FIG. 3 is an enlarged section on the line 3—3 of FIG. 2.

DESCRIPTION OF THE PREFERRED EMBODIMENT

With continued reference to the drawings, an elongated generally cylindrical hollow body or member 10 is provided and such member is disposed along a generally vertical axis. The member 10 is open at each end and defines a refrigerating chamber into which particulate products 11, such as peas, beans, chopped onions, chopped sliced or diced carrots, chopped or ground meats, and the like are adapted to be discharged in any desired manner, as for example from a conveyor 12. The particulate products fall by gravity generally axially of the cylindrical member 10 and are received within a substantially imperforate container or receptacle 13 mounted in airtight relationship by means of a strap 14 on the lower end of the member 10.

In order to modify the temperature of the particulate products as the individual pieces fall through the cylindrical member, a plurality of nozzles 17 are mounted adjacent to the lower end of the member 10. The nozzles 17 communicate with the interior of the cylindrical member and preferably the nozzles are directed to a common point along the axis of the member 10. Each of the nozzles is connected to a supply line 18 and the supply line in turn is connected to a source of expendable refrigerant material in liquid or gaseous form, such as carbon dioxide or the like, under pressure (not shown). When the carbon dioxide is stored in a liquid state, it converts to a gaseous state when injected into the cylindrical member 10. The carbon dioxide gas is heavier than air and therefore such gas first will fill the receptacle 13 and thereafter will be forced up through the cylindrical member 10 in counterflow heat exchange relationship with the particulate products 11 falling downwardly by gravity.

Exteriorly of the cylindrical member 10 and generally concentric therewith is a housing 19 including a liner 20 surrounded by a thermal insulating jacket 21. As illustrated in FIG. 2, the upper portion of the housing 19 is open while the lower end is closed by an end plate 22 attached to the cylindrical member 10 in any desired manner, as by an adhesive, welding, or other conventional means. A discharge pipe 23 is located adjacent to the end plate 22 and is in communication with the interior of the housing 19 to remove spent refrigerant gas from the housing and discharge such gas in a remote location. If desired, a pump (not shown) can be provided along the discharge pipe 23 to assist in discharging material from the housing.

In the operation of the device, particulate products are discharged from the conveyor 12 so that they fall by gravity generally axially of the cylindrical member 10, while a heavier than ambient air refrigerant is introduced under pressure through the nozzles 17 into the lower portion of the cylindrical member. The bottom of the cylindrical member is substantially closed by the receptacle 13, and therefore, the pressure forces the refrigerating gas upwardly in counterflow heat exchange relationship with the particulate products. Since the refrigerant gas is being forced upwardly under pressure, such gas will partially support the particulate products and slow down the rate of descent thereof so that the particulate products will be subjected to heat absorption by the temperature modifying gas for a longer period of time. It is noted that the pressure of the refrigerant and/or the length of the cylindrical member 10 is computed in accordance with the material being treated and the size of the individual pieces so that the treatment of the product substantially will be completed by the time the product passes the nozzles 17.

When pressurized liquid carbon dioxide is being used, the rapid discharging of such liquid and the conversion to a gaseous state builds up a static electricity potential. When the liquid carbon dioxide is discharged into the cylindrical member 10, carbon dioxide flakes or snow is formed, together with carbon dioxide gas. The carbon dioxide flakes are charged with static electricity and are attracted to the particulate products falling by gravity through the chamber, the charge causing the flakes to adhere to the products. This causes more rapid heat transfer from the product and the heat is dissipated through the carbon dioxide gas.

The rapid surface freezing of the products reduces agglomeration or the adhering together of the products and assures individual quick freezing of the products, as well as substantially prevents the freezing of the product onto the inner surface of the member 10. The particulate products with flakes of carbon dioxide clinging thereto fall into the receptacle 13 at the bottom of the cylindrical member 10, and since the receptacle is filled with heavier than air carbon dioxide gas, there is no tendency of the material to begin thawing but instead the freezing process continues until the products are entirely frozen.

The refrigerant gas which is forced up the cylindrical member 10 spills over the open top of such member into the housing 19. Since the refrigerant gas is more dense than the ambient air, oxygen from the atmosphere is excluded from the cylindrical member 10 so that oxidation of the product is substantially eliminated. The refrigerant gas which spills over the top of the cylindrical member 10 flows down the exterior surface thereof to reduce heat transfer through the walls of such member. The spent refrigerant gas at the bottom of the housing 19 is removed through the discharge pipe 23 and may be vented to the atmosphere or may be used as a precooler for the particulate products and subsequently vented to the atmosphere.

Preferably the conveyor 12 is operated by a variable speed motor which can be operated at a selected rate in accordance with the characteristics of the product being treated. In other words, products which freeze easily or relatively small products can be discharged and treated more rapidly than products which are larger or have a higher heat load. Also the nozzles 17 preferably have flow control means (not shown) so that the quantity of refrigerant passing through the nozzles can be regulated or the flow control means can be cut off entirely to prevent the flow of refrigerant through one or more of the nozzles.

Both the rate of movement of the conveyor and the rate of material being introduced into the cylindrical member 10 are controlled in accordance with the product being treated, as well as the desired treatment of the product. In other words, if it is desired to merely chill a product having a low heat load, the conveyor 12 can be accelerated while the flow of refrigerant through the nozzle 17 can be reduced. If it is desired to completely freeze a product having a high heat load, the speed of the conveyor can be reduced while the amount of refrigerant being introduced through the nozzles can be increased.

As a typical example, onions which had been chopped so that the particles were about ⅛ inch cubes were introduced into a cylindrical member approximately 8 inches in diameter and 5 feet in length. Liquid carbon dioxide at 300 psi and 0.0° F. was introduced through the nozzles 17 adjacent to the base of the cylindrical member. Under these conditions approximately 600 pounds of onions per hour were completely frozen.

In this structure when operations are to begin, the nozzles 17 are opened so that refrigerant is introduced into the cylindrical member 10 and as soon as the refrigerant gas reaches the upper open end of the cylindrical member, the apparatus is in condition to begin freezing. Depending upon the diameter and length of the cylindrical member and the amount of refrigerant being introduced thereinto, the system is ready to begin freezing in a matter of 1 to 2 minutes. Therefore the apparatus does not require extensive warm-up periods before freezing can commence. Also at the termination of the freezing operation, the conveyor belt 12 is halted after which the flow of refrigerant into the cylindrical member is interrupted and the receptacle 13 with the frozen product therein is removed. Therefore no extensive cooldown period is required.

If the product being treated is merely to be cooled or chilled, only a fraction of a pound of expendable liquid refrigerant per pound of feed material is required. However, if a complete hard freeze on a product of high specific heat load is desired, then approximately 1 pound of liquid refrigerant may be required for each pound of feed material.

While the foregoing description has disclosed primarily the use of carbon dioxide gas, other refrigerants including those which are ordinarily not heavier than air, such as dichlorodifluoromethane (Freon 12), or nitrogen, may be used if approved by the appropriate authorities.

I claim:

1. Temperature modifying apparatus comprising an elongated hollow member disposed along a generally vertical axis, said member being open at each end, a selectively removable collection receptacle connected in substantially airtight relation to the lower end of said member, means for introducing food articles to be treated into the upper end of said member so that the articles fall by gravity substantially axially thereof, means for introducing an expendable liquid refrigerant under pressure into said member adjacent to said lower end and vaporizing said liquid to a gas, said refrigerant gas being forced upwardly within said member in counterflow heat exchange relationship with said articles and completely filling said member, said refrigerant gas spilling over the open upper end of said member and substantially excluding atmospheric air therefrom, whereby the temperature of the articles falling through said member is modified by said refrigerant.

2. The structure of claim 1 in which said means for introducing liquid refrigerant into said member includes at least one nozzle connected to a source of supply.

3. The structure of claim 1 including a housing spaced from and generally concentric with said elongated member and enclosing the major portion thereof, so that said expendable refrigerant gas spills over the top of said elongated member and flows down the exterior surface thereof to substantially reduce the transfer of heat through the walls of the elongated member.

4. Temperature modifying apparatus for causing temperature change in a plurality of individual articles comprising an elongated hollow member disposed along a generally vertical axis, a selectively removable substantially imperforate collection receptacle mounted in substantially airtight relation adjacent to the lower end of said member, means for introducing food articles to be treated into the upper end of said member so that the articles fall by gravity substantially axially thereof, a plurality of nozzles communicating with the interior of said member adjacent to the lower end thereof, means for introducing an expendable liquid refrigerant through said nozzles into said member and vaporizing said liquid to a gas, said refrigerant gas being forced upwardly through said elongated member in counterflow heat exchange relationship with said articles, said expendable refrigerant completely filling said elongated member and spilling over the upper end of said member to substantially exclude atmospheric air from said member, housing means located about the major portion of said elongated member and in spaced relation thereto so that the refrigerant spilling over the upper end of said member will flow down the exterior surface thereof into the bottom of said housing means, and means for removing spent refrigerant from the lower portion of said housing means, whereby the temperature of the articles falling through said refrigerant is modified.

* * * * *